Figure 1:
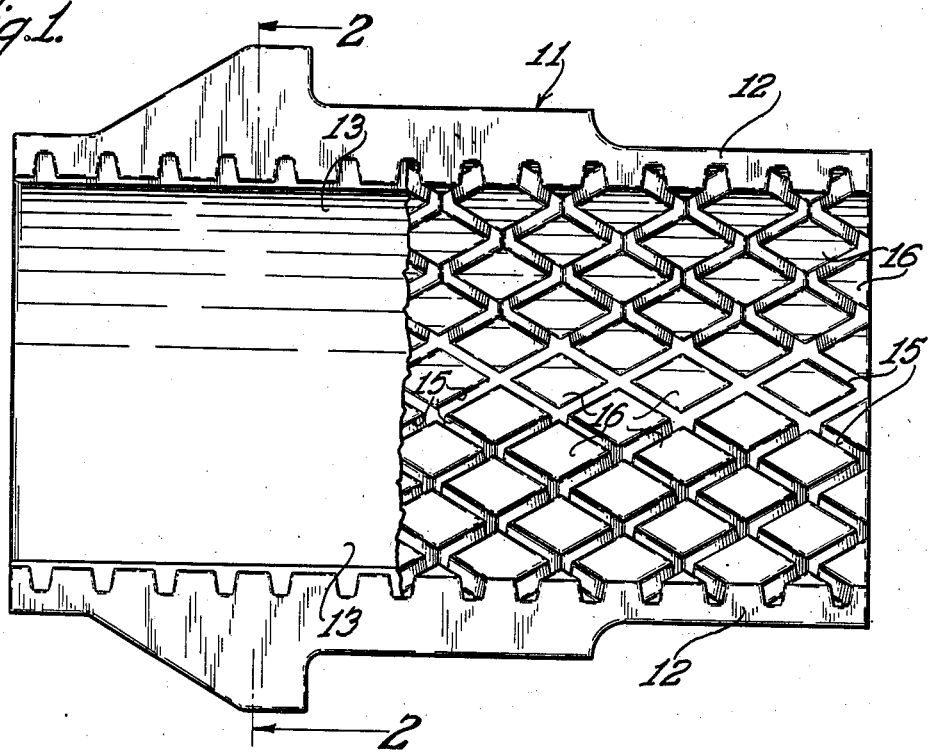

Sept. 8, 1942.  R. J. SHOEMAKER ET AL  2,294,939

JOURNAL BEARING

Filed Aug. 15, 1938

INVENTORS.
Robert J. Shoemaker
Charles M. House
BY Charles B. Rasmussen
ATTORNEY.

Patented Sept. 8, 1942

2,294,939

UNITED STATES PATENT OFFICE 2,294,939

JOURNAL BEARING

Robert J. Shoemaker and Charles M. House, Chicago, Ill.

Application August 15, 1938, Serial No. 224,995

1 Claim. (Cl. 308—56)

This invention relates in general to bearings, and more particularly to composite bearings having a main body or backing member of brass, bronze, or other suitable relatively hard material, and a lining or bearing metal facing of a particular type of soft bearing metal.

A principal object of the invention is the provision of a journal bearing which functions to retard the rate of wear as the wear increases, and which has an increasing resistance to shocks as it wears away.

Another important object of the invention is the provision of a composite journal bearing in which a very thin layer of the particular soft bearing metal is provided on the bearing surface of a hard metal backing and in which spaced inserts of the soft metal are provided in the bearing surface of the hard metal, with the result that the heating difficulties frequently encountered in new hard metal bearings will be eliminated, and the bearing will have great strength, while at the same time having improved anti-friction characteristics.

A further important object of the invention is the provision of a compound journal bearing which is made up of a backing member of relatively hard material, such as brass, bronze, or the like, having a bearing surface with grooves therein, and a lining interposed in the grooves of a relatively soft metallic compound consisting of the following substances in proportions by weight approximately as follows: tin 0.5% to 2.0%, calcium 0.3% to 1.0%, mercury 0.1% to 0.5%, aluminum 0.02% to 0.1%, and metal from the group consisting of magnesium, potassium and lithium 0.02% to 0.22%, together with lead to make up 100%.

Another important object of the invention is the provision of such a journal bearing in which the original bearing surface area of the backing member of hard material bears a ratio of approximately 3 to 2 to the bearing surface area of the inserts of soft material.

A further object of the invention is the provision of such a journal bearing in which the cross sectional area of the grooves and soft metal inserts, in planes concentric with the journal, decreases inwardly of the bearing, preferably to a ratio of hard metal to soft metal bearing surface areas of approximately 3 to 1 adjacent the bottom of the grooves, as compared with the initial ratio of 3 to 2.

Numerous other objects and advantages of the invention will be apparent as it is better understood from the following description, which, when taken in connection with the accompanying drawing, discloses a preferred embodiment thereof.

Figure 2:
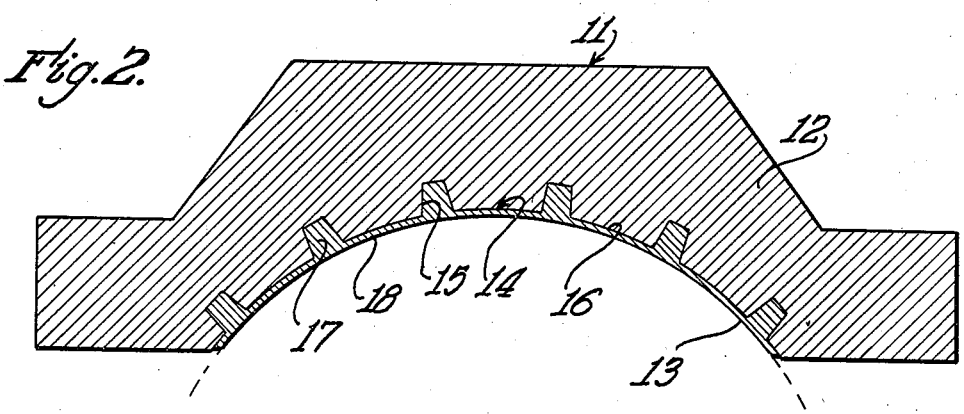

In the drawing:

Figure 1 is a bottom plan view of a journal bearing embodying the features of the instant invention, with part of the lining portion broken away; and Figure 2 is a vertical sectional view taken substantially on the line 2—2 of Fig. 1.

Referring more particularly to the drawing, reference numeral 11 indicates in general a journal bearing of any desired or suitable size and shape, which comprises a backing member or "brass" 12 and a bearing facing or lining portion 13. The "brass" or body portion 12 is preferably cast from brass, bronze, copper or any other suitable relatively hard metal, and is provided with the usual curved bearing surface 14. In the instant bearing, this surface 14 is preferably either cast or machined to very slightly larger than required size, and is formed in any suitable manner with a plurality of recesses 15 therein. In the preferred embodiment, these recesses 15 are in the form of two sets of diagonal grooves, the grooves of each set being spaced in parallel relationship to each other, and the grooves of the two sets intersecting to provide spaced, diamond-shaped portions 16 on the lower curved surface 14 of the "brass" 12. The cross sectional shape of each of the grooves 15 is that of a truncated isosceles triangle. In other words, the width of each of the grooves 15 is greater at the surface 14 than it is at the upper or interior portion thereof, for a purpose to be later described.

The lining portion 13 is cast on this grooved surface 14 of the "brass" 12 in any suitable manner to provide truncated portions or inserts 17 in the grooves 15 and a very thin layer 18 covering the surface 14. The lining portion 13 may be thus cast to desired size, or it may be subsequently machined to a curvature equal to that of the diameter of the journal, shown in broken lines at 19 in Fig. 2, with which it is adapted to be used.

It has been found that only one particular type of soft metal gives entirely satisfactory results when used for the instant lining portion 13. This particular soft metallic compound consists of the following substances in proportions by weight approximately as follows:

Tin _____ 0.5% to 2.0%, preferably 1.0%;
Calcium ____ 0.3% to 1.0%, preferably 0.5%;
Mercury ____ 0.1% to 0.5%, preferably 0.25%;
Aluminum __ 0.02% to 0.1%, preferably 0.05%;
Magnesium__ 0.05% to 0.1%, preferably 0.075%; and/or
Potassium __ 0.02% to 0.06%, preferably 0.04%; and/or
Lithium ____ 0.02% to 0.06%, preferably 0.04%,
Lead _____ To make up 100%.

With the above described bearing, the very thin layer 18 of soft metal forming the lining portion will come to a bearing surface when initially used very quickly, and will eliminate the heating difficulty which would be encountered if a hard metal bearing alone were employed. At the same time, the "brass" 12 gives the necessary strength to the bearing 11 which the soft metal lining portion 13 lacks. The waffle iron effect provided by the grooves 15 adds mechanical strength to the bearing to prevent "squashing" of the soft bearing metal forming the lining portion 13, and to prevent flowing or loss of the lining portion should conditions occur to cause it to come loose from the "brass."

As the bearing 11 is initially used, the thin lining portion 18 will be worn away so that the diamond-shaped portions 16 of the surface 14 of the "brass" space 12 will contact the journal 19. When this condition obtains, the soft metal inserts 17 will provide metal lubrication for the harder metal portions 16 to prolong the life of the bearing, as well as to offer a partial soft metal bearing surface, to produce a bearing which is far superior to a hard metal bearing surface alone. As will be noted from Fig. 1 of the drawing, the initial bearing area of the diamond-shaped portions 16 of the surface 14 of the hard metal backing member 12 is much greater than that of the soft metal inserts 17. The preferred ratio of hard metal to soft metal at this point in the bearing is approximately 3 to 2.

Increased wear of the bearing past this point will increase the ratio of hard metal to soft metal exposed, so as to retard the rate of wear of the bearing and increase in bearing size above the optimum. To attain these desired results, the grooves 15 and the soft metal inserts 17 are spaced as above described with the upper or innermost cross sectional width thereof less than the width at the original bearing surface. This gradual inward or upward increase of the ratio of hard metal to soft metal, in planes concentric with the plane of the surface 14 and the journal 19, is preferably such that adjacent the bottom of the grooves 15 the ratio of hard metal to soft metal is approximately 3 to 1.

The instant invention is applicable to flat bearing surfaces, such as cross head shoes, side bearings for end thrust, etc., as well as curved bearing surfaces, such as the crown bearing shown herein in the preferred embodiment. It further contemplates the elimination of the very thin lining portion 18 where such is desired in certain types of installations. Also, the shape and size of the recesses in the bearing surface of the hard metal portion may be varied as desired, the invention contemplating the use of drilled or cast holes of any desired shape and spacing relative to each other in the hard metal employed. The invention permits the use of soft bearing metal with its attendant advantages for application where a load has been considered to be too great for it in the past. It provides such a bearing having these advantages combined with the strength of hard metal, and it is resistant to flow under maximum load and to bending stresses of the shaft or journal.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

A journal bearing, comprising a backing member of relatively hard metal having a bearing surface and a plurality of diagonal grooves therein intersecting each other to provide spaced, diamond-shaped portions on said bearing surface of substantially greater total area than said grooves, and a lining portion of relatively soft metal secured to said backing portion, comprising inserts disposed within said grooves, and a thin bearing portion formed integrally with said inserts covering said diamond-shaped portions to provide a uniform surface on the entire bearing, the thickness of said bearing portions over said diamond shaped portions being uniform to facilitate initial running in of the bearing, the cross sectional areas of said grooves and inserts, in the plane of said bearing surface, decreasing inwardly from said bearing surface to provide increasing resistance to shock as the bearing is worn away.

ROBERT J. SHOEMAKER.
CHARLES M. HOUSE.